Oct. 10, 1933.  H. EWEST ET AL  1,930,122
GASEOUS ELECTRIC DISCHARGE DEVICE
Filed Dec. 26, 1929

INVENTOR
Hans Ewest
Peter Herre
Charles E. Tullar
THEIR ATTORNEY

Patented Oct. 10, 1933

1,930,122

UNITED STATES PATENT OFFICE 1,930,122

GASEOUS ELECTRIC DISCHARGE DEVICE

Hans Ewest, Berlin, and Peter Herre, Fichtenau, Germany, assignors to General Electric Company, a corporation of New York Application December 26, 1929, Serial No. 416,333, and in Germany April 20, 1929

4 Claims. (Cl. 250—27.5)

The present invention relates to gaseous electric discharge devices generally and particularly the invention relates to such devices of the cathode glow type.

It is well known that such devices may be used as potential indicators not only in a single circuit, but also in several series connected circuits by the provision of a proper number of electrodes contained in one glass chamber and having their discharge paths connected in series. It is the object of this invention to provide a gaseous electric discharge device of the cathode glow type having a plurality of series connected electrodes arranged so as to simplify and give the device a compact structure.

The invention attains its object by the arrangement of intermediate or middle electrodes in a glass chamber in such a way that each of these electrodes has two separate discharge surfaces, one on each of the two sides of said electrodes. Each of these two electrodes, by being provided with two separate and distinct discharge surfaces, is adaptable to operate simultaneously as anode and cathode. This makes possible the elimination of two electrodes with a consequent saving of space.

The intermediate dual functioning electrodes consist of hollow metal cylinders covered at one end and are arranged next to each other. The outer walls of said electrodes are in close proximity to the inner insulating glass walls of the container, so that the discharge between said electrodes is confined to the adjacent discharge surfaces. Under these conditions an evenly distributed glow discharge covers the discharge surfaces. A very compact structure of the new cathode glow lamp is attained by using intermediate electrodes consisting of concentric hollow metal cylinders covered at one end, with the rims of their open ends located in a plane and covered by an insulating plate. The container then need only be made slightly larger than the largest electrode.

Figure 1:
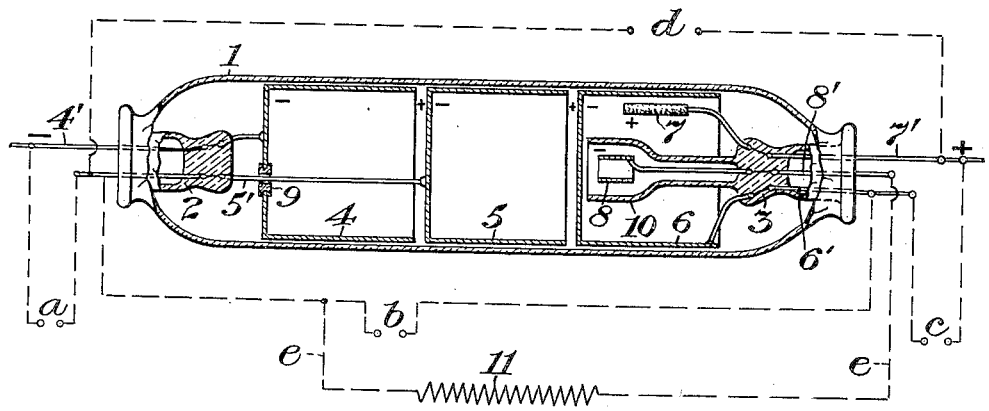
Figure 2:
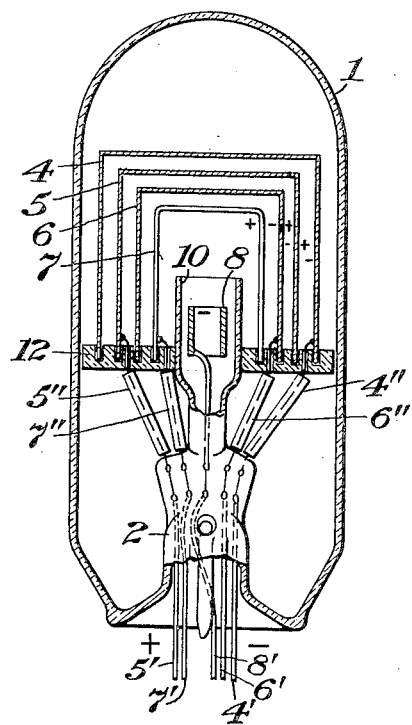

In the drawing accompanying and forming part of this specification two embodiments of the invention are shown for purposes of illustration, in which Fig. 1 is a side elevational view of one embodiment of the new and novel cathode glow device shown partly in section, and Fig. 2 is a sectional elevational view of an alternative embodiment of the invention.

Referring to Fig. 1 the device consists of glass container 1 filled with a rare gas or gases and having stems 2, 3 fused therein at either end. Current leads 4', 5', 6', 7' and 8' are sealed into the pinch-part of said stems 2, 3 and support electrodes 4, 5, 6, 7 and 8. Lead 5' of the electrode 5 passes through insulating disk 9 set into electrode 4. Electrodes 4, 5, and 6 are hollow metal cylinders closed at one end and are axially arranged in the glass container 1 in close proximity to the glass walls of the container 1 and in close proximity to each other. The outer diameter of said cylindrical electrodes 4, 5, 6 closely approaches that of the inner diameter of the glass container 1 to prevent the development of a glow discharge on the outer walls of electrodes 4, 5, 6. The electrodes 4, 5, 6 are made of a suitable conducting material such as iron, nickel or aluminum, and are coated with a suitable electron emitting substance such as barium azide or caesium azide in order to lower the cathode drop. Said electron emitting substance need not cover the entire electrode surface, it being sufficient if only a part of the electrode surface is coated the glow discharge thus being restricted to the coated area. Electrode 7 is a small metal rod or wire. Electrode 8 is a small metal cylinder, and is surrounded by neck 10 fused to stem 3. Said neck 10 is made of glass or other insulating material which enables it to serve its purpose of lengthening the discharge path between the electrodes 7 and 8.

The discharge paths or gaps between the electrodes 4—5, 5—6 and 6—7 are connected in series to main current leads 4' and 7', so that the electrode 7 acts always as the anode and electrode 4 always as the cathode. Owing to the close proximity of the outer cylindrical walls of electrodes 5, 6 to the inner walls of the glass container 1 only the outer walls of the closed ends of these electrodes can act as positive discharge surfaces for the discharge paths. The inner walls of said electrodes 5, 6 then act as negative discharge surfaces for the discharge paths between these electrodes. Thus, each of said electrodes 5, 6 operates simultaneously as anode and cathode. In order to establish the various discharge paths it is necessary to furnish sufficient potential. The potential necessary for this purpose is governed or determined by the distance between the electrodes, the gas filling used, the pressure of the latter, and the surface nature of the electrodes. Assuming that 80 volts is necessary to establish each of the three series connected discharge paths 4—5, 5—6 and 6—7 then current leads 4', 7' must carry a line potential of 240 volts simultaneously transmitted to the four electrodes 4, 5, 6 and 7 in order to set the three discharge paths 4—5, 5—6 and 6—7 into operation simultaneously.

Electrode 8 is arranged so as to operate as a cathode in relation to the anode 7. For this purpose the current lead 8' is connected to current lead 5' of the electrode 5 through a resistance 11. The discharge path between the electrodes 7 and 8 is thereby connected in parallel with the other three discharge paths. In the example given above, assuming that 160 volts is the breakdown potential of the two discharge paths between electrodes 5, 6 and 7 and that the breakdown potential of the discharge path between electrode 7—8 is 100 volts, then the resistance 11, connected in series with electrode 8 must be set for 60 volts.

From the foregoing it will be apparent that it is possible to take off different potentials from this devices to use in operating amplifying tubes and other electrical devices. For instance; two lines "a", having a device using 80 volts connected thereto, are connected to current leads 4', 5'. Thus, only the first of the three series connected discharge paths is used and 80 volts are taken off from the device. In like manner lines "b" and "c" can be connected to current leads 5', 6' or 6', 7' and in this case only the second and third series connected discharge paths are used separately and again 80 volts in each case are taken off from the device. Lines "d" can be connected to current leads 5' and 7' and in this case as two series connected discharge paths are used, instead of only one as above, 160 volts are taken off from the device instead of only 80 volts. The parallelly connected discharge path between the electrodes 7 and 8 can be used for taking out of the tube a small portion of the voltage input if resistance 11 is replaced by a 60 volt anode potential amplifying tube connected to lines "e".

The electrodes 4, 7 and 8 of the device shown in Fig. 1, since they each function as of single polarity, can be made in a variety of shapes. Both the inner electrodes 5, 6 in this embodiment of the invention must be in such shape, that they will fit closely to the inner walls of glass container 1 not only to prevent the forming of a glow discharge on the outer electrode surface but also to prevent an electric discharge getting by said surface.

The device shown in Fig. 2 is, in operation, an equivalent cathode glow device to that shown in Fig. 1. In Fig. 2, the device consists of a glass container 1 with stem 2 fused therein, said stem 2 having five current leads 4', 5', 6', 7' and 8' sealed therein which are connected to the five electrodes 4, 5, 6, 7 and 8 respectively. The electrodes 4, 5 and 6 are hollow metal chambers and are mounted concentrically to each other in such a manner that the rims of their open sides lie in a plane. These open edges are covered by a suitable insulating plate 12, through which pass the current leads 4', 5', 6' of the three electrodes 4, 5, 6 and the current lead 7' of electrode 7 which is a suitably bent piece of metal arranged in the interior of the device. Parts of the current leads 4', 5', 6', 7' are situated between the insulating plate 12 and the pinch part of the base tube 2. Said parts are enclosed in glass tubes 4", 5", 6", 7" which are utilized to support the insulation plate 12 and therewith the electrodes. The four electrodes 4, 5, 6 and 7 are again connected in series, so that the inner curved shaped electrode 7 operates as the anode, and the outer electrode 4 operates as the cathode, whereas the two surrounded inner electrodes 5, 6 operate simultaneously both as anodes and as cathodes. Because of insulating plate 12 the cathode glow discharge can develop only on the inner walls of both the electrodes 5, 6. The fifth electrode 8 is surrounded by an insulating neck part 10 fused into stem 2 for the purpose of lengthening the discharge path.

While we have shown, described and have pointed out in the annexed claims certain new and novel features of the invention it will be understood that various omissions, substitutions and changes may be made in the various parts of the device and in the use and operation thereof without departure from the broad spirit and scope of the invention.

We claim:

1. An electric discharge device comprising a container, a gas filling therein, a plurality of electrodes therein, an insulation chamber therein, one of said electrodes being adapted to operate simultaneously as anode and cathode and one of said electrodes being mounted in said insulation chamber the end of said insulation chamber extending beyond the end of the electrode mounted therein.

2. An electric discharge device comprising a container, a gas filling therein, a plurality of electrodes therein, an insulating chamber therein, one of said electrodes being a hollow cylinder closed at one end, axially mounted in the container, the distance between the outer walls of said electrode and the inner walls of said container being less than that necessary for gaseous conduction and one of said electrodes being mounted in said insulating chamber.

3. An electric discharge device comprising a container, a gas filling therein, a plurality of electrodes therein, an insulating chamber therein, some of said electrodes being hollow cylinders closed at one end concentrically mounted with their rims located in a plane, one of said electrodes being a bent rod located in the interior of the hollow electrodes, an insulating plate covering the ends of the bent electrode and the rims of the hollow electrodes, and one electrode being a small hollow cylinder mounted in said insulating chamber.

4. An electric discharge device comprising a container, a gas filling therein, a plurality of electrodes therein, an insulating chamber therein, one of said electrodes being a hollow cylinder closed at one end, axially mounted in the container in close proximity to the walls of the container, the discharge paths between some of said electrodes being in series relation, one electrode being mounted in said insulating chamber.

HANS EWEST.
PETER HERRE.